United States Patent
Chin (10) Patent No.: US 9,500,560 B2
(45) Date of Patent: Nov. 22, 2016

(54) BRILLOUIN OPTOELECTRONIC MEASUREMENT METHOD

(71) Applicant: Omnisens SA, Morges (CH)

(72) Inventor: Sanghoon Chin, Ecublens (CH)

(73) Assignee: OMNISENS SA, Morges (CH)

( * ) Notice: Subject to any disclaimer, the term of this patent is extended or adjusted under 35 U.S.C. 154(b) by 0 days.

(21) Appl. No.: 14/441,893

(22) PCT Filed: Nov. 12, 2012

(86) PCT No.: PCT/EP2012/072384
§ 371 (c)(1),
(2) Date: May 11, 2015

(87) PCT Pub. No.: WO2014/071997
PCT Pub. Date: May 15, 2014

(65) Prior Publication Data
US 2015/0308923 A1    Oct. 29, 2015

(51) Int. Cl.
| | | |
|---|---|---|
| G01N 21/00 | (2006.01) |
| G01M 11/08 | (2006.01) |
| G01D 5/353 | (2006.01) |
| G01D 5/26 | (2006.01) |
| G01K 13/00 | (2006.01) |

(52) U.S. Cl.
CPC ............ G01M 11/085 (2013.01); G01D 5/268 (2013.01); G01D 5/35364 (2013.01); G01K 13/00 (2013.01)

(58) Field of Classification Search
CPC ............ G01M 11/3145; G01M 11/335; G01M 11/33; G01M 11/3109; G01M 11/338
USPC ....................................... 356/73.1
See application file for complete search history.

(56) References Cited

U.S. PATENT DOCUMENTS

| | | | |
|---|---|---|---|
| 2003/0058504 A1* | 3/2003 | Cho .................. | H04L 7/0075 398/147 |
| 2006/0018586 A1 | 1/2006 | Kishida | |
| 2008/0013096 A1* | 1/2008 | Bernini ............... | G01D 5/268 356/483 |
| 2009/0141267 A1* | 6/2009 | Hotate ................ | G01M 11/088 356/73.1 |
| 2013/0265569 A1* | 10/2013 | Le Floch ........... | G01D 5/35364 356/73.1 |
| 2013/0286378 A1* | 10/2013 | Dutoit ................ | E21B 47/0001 356/32 |
| 2014/0152982 A1* | 6/2014 | Gosteli .............. | G01M 11/085 356/300 |

FOREIGN PATENT DOCUMENTS

| | | |
|---|---|---|
| EP | 1760424 A1 | 3/2007 |
| EP | 2362190 A1 | 8/2011 |
| WO | 2010058438 A1 | 5/2010 |

OTHER PUBLICATIONS

International Search Report and Written Opinion for PCT/EP2012/072384 dated Aug. 12, 2013.

* cited by examiner

*Primary Examiner* — Tarifur Chowdhury
*Assistant Examiner* — Md M Rahman
(74) *Attorney, Agent, or Firm* — Pearne & Gordon LLP (57) ABSTRACT

A Brillouin optoelectronic measurement method includes the steps of, providing a pump signal in a first end of an optical fiber to generate Brillouin backscattering, using the generated Brillouin backscattering to perform a measurement, wherein the pump signal includes a front pulse and a rear pulse, wherein the front pulse is modulated.

8 Claims, 6 Drawing Sheets

BRILLOUIN OPTOELECTRONIC MEASUREMENT METHOD

FIELD OF THE INVENTION

The present invention concerns a Brillouin optoelectronic measurement method, and in particularly, a Brillouin optoelectronic measurement method in which the pump signal comprises a front pulse and a rear pulse, wherein the front pulse is modulated.

DESCRIPTION OF RELATED ART

In many fields of application, like pipeline, power cables or subsea, the use of measuring apparatuses to monitor continuously structural and/or functional parameters is well known. The measuring apparatuses can be applied also to the civil engineering sector, and in particular in the field of the construction of structures of great dimensions.

The measuring apparatuses are commonly used to control the trend over time of the temperature or of the strain, i.e. of the geometrical measure of the deformation or elongation resulting from stresses and defining the amount of stretch or compression along the fibre, of the respective structure. In more detail, these measuring apparatuses are suitable to give information of local nature, and they can be therefore used to monitor, as a function of the time, the temperature or the strain associated with a plurality of portions and/or of components of the engineering structure to be monitored, providing useful information on leak, ground movement, deformation, etc. of the structure.

Among the measuring apparatuses used to monitor the status of engineered or architectonic structures, the optoelectronic devices based upon optical fibres have a great significance. In particular, these apparatuses normally comprise an electronic measuring device, provided with an optical fibre probe which is usually in the order of a few tens of kilometers. In use, this optical fibre is coupled stably to, and maintained substantially into contact with, portions or components of the engineered structure, whose respective physical parameters shall be monitored. For example, this optical fibre can run along the pipes of an oil pipeline, or it can be immersed or integral to a concrete pillar of a building, so that it can be used to display the local trend of the temperature or of the strain of these structures. In other words these optoelectronic devices comprise fibre optical sensors, i.e. sensors using the optical fibre as the sensing element. Fibre optical sensors can be:

point sensors, wherein only one location along the optical fibre is made sensitive to the temperature and/or the strain;

quasi-distributed sensors or multiplexed sensors, wherein many point sensors are connected to each other by an optical fibre and multiplexed along the length of the fibre by using different wavelength of light for each sensor; or distributed or fully distributed sensors, wherein the optical fibre is a long uninterrupted linear sensor.

These measuring instruments based upon optical fibres can be subdivided into various types depending upon both the physical quantity/ies they are suitable to measure and the physical principle used to detect this quantity/these quantities.

When a powerful light pulse of wavelength $\gamma_0$ (or frequency $v_0=c/\gamma_0$, wherein c is the speed of light), known as a pump signal, propagates through an optical fibre, a small amount of the incident power is scattered in every directions due to local non-homogeneities within the optical fibre. If the optical fibre is a single-mode fibre (SMF), i.e. a fibre designed for carrying a single ray of light (mode) only, then only forward and backward scattering are relevant since the scattered light in other directions is not guided. Backscattering is of particular interest since it propagates back to the fibre end where the laser light was originally launched into the optical fibre.

Scattering processes originate from material impurities (Raleigh scattering), thermally excited acoustic waves (Brillouin scattering) or atomic or molecular vibrations (Raman scattering).

Distributed sensing techniques rely on the analysis of the backscattered signal created at different location along the fibre.

RAYLEIGH SCATTERING is the interaction of a light pulse with material impurities. It is the largest of the three backscattered signals in silica fibres and has the same wavelength as the incident light. Rayleigh scattering is the physical principle behind Optical Time Domain Reflectometer (OTDR).

BRILLOUIN SCATTERING is the interaction of a light pulse with thermally excited acoustic waves (also called acoustic phonons). Acoustic waves, through the elasto-optic effect, slightly, locally and periodically modify the index of refraction. The corresponding moving grating reflects back a small amount of the incident light and shifts its frequency (or wavelength) due to the Doppler Effect. The shift depends on the acoustic velocity in the fibre while its sign depends on the propagation direction of the travelling acoustic waves. Thus, Brillouin backscattering is created at two different frequencies around the incident light, called the Stokes and the Anti-Stokes components. In silica fibres, the Brillouin frequency shift is in the 10 GHz range (0.1 nm in the 1550 nm wavelength range) and is temperature and strain dependent.

RAMAN SCATTERING is the interaction of a light pulse with thermally excited atomic or molecular vibrations (optical phonons) and is the smallest of the three backscattered signals in intensity. Raman scattering exhibits a large frequency shift of typically 13 THz in silica fibres, corresponding to 100 nm at a wavelength of 1550. The Raman Anti-Stokes component intensity is temperature dependent whereas the Stokes component is nearly temperature insensitive.

Figure 1:
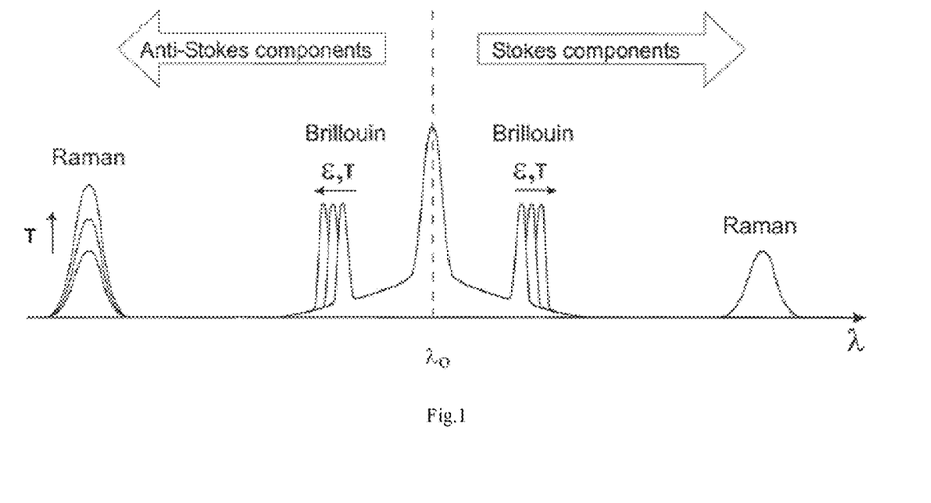
FIG. 1 schematically shows a spectrum of the backscattered light generated at every point along an optical fibre when a laser light is launched in the optical fibre.

FIG. 1 schematically shows a spectrum of the backscattered light generated at every point along the optical fibre when a laser light is launched in the optical fibre. The higher peak, at the wavelength $\gamma_0$, corresponding to the wavelength of a single mode laser, is the Rayleigh peak, originated from material impurities. The so-called Stokes components and the so-called anti-Stokes components are the peaks at the right and left side of the Rayleigh peak. The anti-Stokes Raman peak, originated from atomic or molecular vibrations, has an amplitude depending on the temperature T. The Stokes and anti-Stokes Brillouin peaks, generated from thermally excited acoustic waves, have a frequency depending on the temperature T and on the strain $\epsilon$.

The Brillouin shift (wavelength position with respect to the original laser light) is an intrinsic physical property of the fibre material and provides important information about the strain and temperature distribution experienced by an optical fibre.

The frequency information of Brillouin backscattered light can be exploited to measure the local temperature or strain information along an optical fibre. Standard or special single-mode telecommunication fibres and cables can be used as sensing elements. The technique of measuring the local temperature or strain is referred to as a frequency-based technique since the temperature or strain information is contained in the Brillouin frequency shift. It is inherently more reliable and more stable than any intensity-based technique, based on the Raman effect, which are sensitive to drifts, losses and variations of attenuations. As a result, the Brillouin based technique offers long term stability and large immunity to attenuation. In addition, the Brillouin scattering must satisfy a very strict phase condition, making the interaction to manifest as a spectrally narrow resonance, resulting in an accurate measurement. This process of propagating a pulse of light (pump signal) into the optical fibre and measuring the backscattering signal is called Spontaneous Brillouin Scattering (SPBS): Spontaneous Brillouin Scattering is a small effect, thus it leads to a low intensity scattered light.

The Brillouin scattering process has the particularity that it can be stimulated by a second optical signal—called the probe signal. The probe signal is provided in addition to the first optical signal—called the pump signal. The probe signal can stimulate backscattering of the pump signal provided that the probe signal fulfils specific conditions. This property is especially interesting for sensing applications and can be achieved by the use of a probe signal counter propagating with respect to the pump signal. Stimulation is maximized when pump and probe frequencies (or wavelengths) are exactly separated by the Brillouin shift. In this case, the energy transferred from the pump signal to the probe signal (or vice and versa depending on the selected Stokes/anti-Stokes backscattering signal) results in a greatly enhanced backscattered intensity and thus a larger Signal-to-Noise Ratio (SNR). This is seen as a resonant phenomenon where an amplification of the probe signal power occurs at the expense of the pump signal power when the resonant condition is fulfilled, i.e. when the frequency difference between pump and probe matches the local Brillouin frequency.

In the known solutions the pump signal is composed by one or more nanoseconds long optical pulses and the probe by a Continuous Wave—CW light.

The most-widely used optoelectronic measurement devices based on Stimulated Brillouin Backscattering (SBS) is known as Brillouin Optical Time Domain Analysers or BOTDA; as opposed to Brillouin Optical Time Domain Reflectometers (BOTDR) which are based on spontaneous Brillouin backscattering (SPBS).

An optoelectronic measurement device based on BOTDA normally performs a frequency domain analysis and a time domain analysis.

Frequency domain analysis: the temperature/strain information is coded in the Brillouin frequency shift. Scanning the frequency of the probe signal with respect to the pump signal while monitoring the intensity of the backscattered signal allows to find the Brillouin gain peak, and thus the corresponding Brillouin shift, from which the temperature or the strain can be computed. This is achieved by using two optical sources, e.g. lasers, or a single optical source from which both the pump signal and the probe signal are created. In this case, an optical modulator (typically a telecommunication component) is used to scan the probe frequency in a controlled manner.

Time domain analysis: due to the pulsed nature of the pump signal, the pump/probe signal interaction takes place at different location along the fibre at different times. For any given location, the portion of probe signal which interacted with the pump arrives on a detector after a time delay equal to twice the travelling time from the fibre input to the specified location.

Thus, monitoring the backscattered intensity with respect to time, while knowing the speed of light in the fibre, provides information on the position where the scattering took place.

Figure 2A:
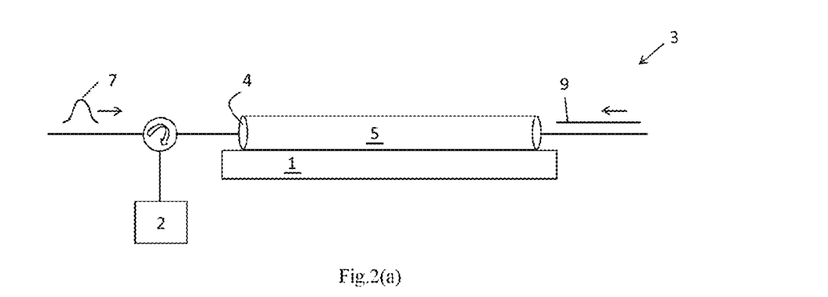
FIG. 2a illustrates how a distributed sensing method using Stimulated Brillouin backscattering is performed to detect temperature and strain along a structure.

FIG. 2a shows a system 3, illustrating how a distributed sensing technique using stimulated Brillouin backscattering is performed to detect temperature and strain along a structure 1. The basic steps required to perform distributed sensing using stimulated Brillouin backscattering are well known in the art and so will be described briefly. An optical fibre is attached to the structure 1. A pump signal 7 is passed through a first end 4 of the optical fibre 5. A probe signal 9 is passed through an opposite end of the optical fibre 5. The probe and pump signals 9,7 will propagate in opposite directions along the optical fibre 5. When the probe and pump signals 9,7 interact their interaction will generate stimulated Brillouin backscattering as previously explained. The frequency of the probe signal 9 is scanned and the intensity of the stimulated Brillouin backscattered signal is measured by a signal processor 2. The frequency at which the intensity of stimulated Brillouin backscattering is a maximum is the Brillouin frequency. Thus, any shift in the Brillouin frequency can be detected by monitoring shifts in the frequency at which the maximum stimulated Brillouin backscattering occurs. The system 3 operates to determine the Brillouin frequency and thus to detect the occurrence of a shift in the Brillouin frequency.

Figure 3A:
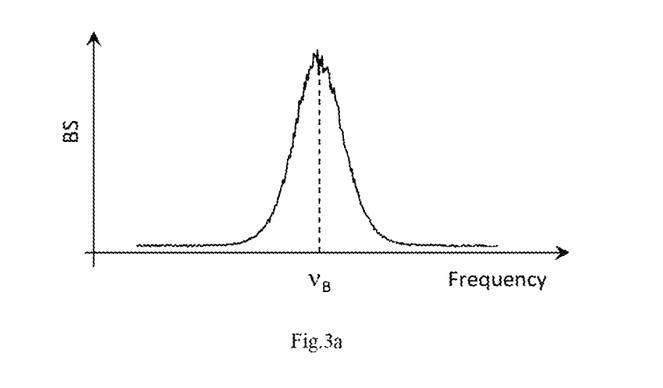

FIG. 3a is a Brillouin backscattering spectrum which is a graph of the intensity of stimulated Brillouin backscattering (BS) measured versus frequency (freq), when performing the method illustrated in FIG. 2a. The intensity of stimulated Brillouin backscattering (BS) is measured as the frequency of the probe signal is scanned. Then the frequency at which the maximum intensity of stimulated Brillouin backscattering occurs is identified as the Brillouin frequency $V_B$.

When the temperature of the structure 1 changes, or when strain is applied to the structure 1, then the temperature or strain experienced by the optical fibre 5 will change. The change in the temperature or strain experienced by the optical fibre 5 will cause a shift in the Brillouin frequency. Thus by monitoring for shifts in the Brillouin frequency, changes in the temperature and strain of the structure 1 can be detected. By scanning the probe signal 9 again and measuring the intensity of the stimulated Brillouin backscattering, the new Brillouin frequency value can be determined and thus the shift in the Brillouin frequency which has occurred can be determined.

The shift in Brillouin frequency can be used to derive the temperature and strain change which has occurred in the structure, since the Brillouin frequency of optical fiber has linear dependence on temperature and strain with coefficient of 1 MHz/K and 500 MHz/%☐ respectively, wherein K is temperature (measured in Kelvin) and '%' is the amount of axial elongation or compression of optical fiber. Therefore, the change in temperature and/or strain which has occurred in the structure can be quantitatively monitored, simply by measuring the amount of change in Brillouin frequency. Using time domain analysis of the stimulated Brillouin backscattering the location on the structure, where the temperature or strain change has occurred, can be determined.

The absolute temperature and strain at a point along the structure can also be determined from a pre-calibration process, in which Brillouin frequency of the fiber is measured when the structure is at known temperatures and strains. When monitoring the structure, the results from the pre-calibration process can be used to convert measured Brillouin frequency to an absolute temperature and/or absolute strain. Therefore, the measured Brillouin frequency can represent the absolute temperature and strain of the structure due to the linear relationship between Brillouin frequency and change in temperature and strain. Using time domain analysis of the stimulated Brillouin backscattering, the location along the structure where the determined temperature and strain is occurring, can be determined.

The spatial resolution of the temperature and strain measurement i.e. the accuracy with which the position at which the temperature and strain change took place in the structure 1, is directly proportional to the duration of the pulse signal 7. However the spectral width of the generated stimulated Brillouin backscattering is inversely proportional to the duration of the pulse signal 7.

Figure 2B:
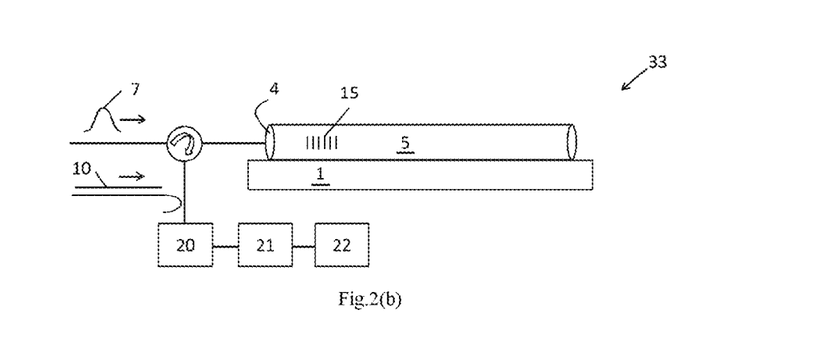
FIG. 2b illustrates how a distributed sensing method using spontaneous Brillouin backscattering is performed to detect temperature and strain along a structure.

FIG. 2b illustrates how a distributed sensing method using spontaneous Brillouin backscattering is performed to detect temperature and strain along a structure 1, using a system 33. The basic steps required to perform distributed sensing using spontaneous Brillouin backscattering are well known in the art and so will be described briefly. An optical fibre is attached to the structure 1. A pump signal 7 is passed through a first end 4 of the optical fibre 5. Once the pump signal 7 is provided in the optical fiber 5, the molecules of the optical fiber will be vibrated along the fiber due to interaction with the pump signal 7. Such vibration of molecules is referred to as acoustic phonon. The acoustic phonon propagates through the fiber at a velocity equal to the velocity of sound. As a result, the acoustic phonon will generate acoustic waves 15, in the optical fiber 5. Parts of the pump signal 7 will be backscattered by the acoustic waves 15; the parts of the pump signal 7 which are backscattered by the acoustic waves 15 are referred to a spontaneous Brillouin backscattering. The spontaneous Brillouin backscattered is combined with an optical local oscillator signal 10 before entering into an optical detector 20, so that their mutual interference results in an optical beat signal. The detector 20 operates to convert the optical beat signal to an electrical beat signal. An electrical microwave module 21 is used to precisely select a particular frequency band, which is a part of a spectrum of the electrical beat signal. The intensity of the particular frequency band is acquired in time by a signal processor 22 while spectrally shifting the particular band in the vicinity of the electrical beat signal spectrum. It results in the distribution of the electrical beat signal spectrum, which is a duplicate of the Brillouin scattering spectrum, (similar to that shown in FIG. 3b). Therefore, the distribution of the electrical beat signal spectrum is the distribution of spontaneous Brillouin scattering spectrum. This method is known, in prior art, as coherent detection; but it should be noted that there are many other possible methods already demonstrated in prior art, which could be utilized to obtain the spontaneous Brillouin scattering spectrum. It should be noted that any of these known methods could be used when performing the method of the present invention.

The intensity of the spontaneous Brillouin backscattered signal is measured by the system 33. The frequency at which the intensity of spontaneous Brillouin backscattered signal is a maximum, is the Brillouin frequency. Thus, any shift in the Brillouin frequency can be detected by detecting changes in the frequency at which maximum intensity of the spontaneous Brillouin backscattered signal occurs. The system 33 operates to determine the Brillouin frequency and thus to detect the occurrence of a shift in the Brillouin frequency.

The shift in Brillouin frequency can be used to derive the temperature and strain change which has occurred in the structure. Due to the linear dependence of Brillouin frequency of optical fiber on temperature and strain the shift in the measured Brillouin frequency quantitatively represents a change in temperature and strain which has occurred in the structure. Using time domain analysis of the stimulated Brillouin backscattering the location on the structure, where the temperature or strain change has occurred, can be determined.

The absolute temperature and strain at a point along the structure can also be determined from a pre-calibration process, in which the Brillouin frequency is measured when the structure 1 is at a known temperature and strain. Thus, when monitoring the structure 1, a measured Brillouin frequency can be converted to the absolute temperature and strain. Therefore, the consequently measured Brillouin frequency can represent the absolute temperature and strain of the structure. Using time domain analysis of the stimulated Brillouin backscattering, the location along the structure where the determined temperature and strain is occurring, can be determined.

Figure 3B:
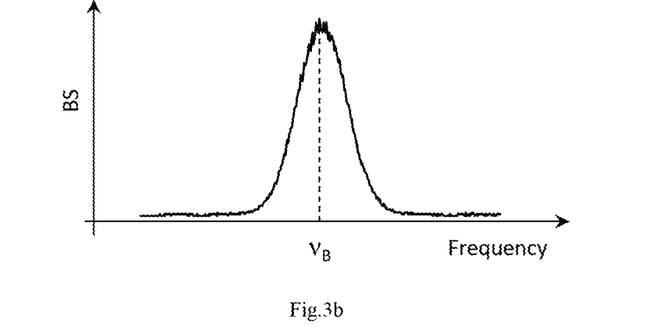
FIG. 3b is a Brillouin backscattering spectrum which is a graph of the intensity of spontaneous Brillouin backscattering (BS) measured versus frequency (freq), when performing the method illustrated in FIG. 2b.

FIG. 3b is a Brillouin backscattering spectrum which is a graph of the intensity of spontaneous Brillouin backscattering (BS) measured versus frequency (freq), when performing the method illustrated in FIG. 2b. Then the frequency at which the maximum intensity of spontaneous Brillouin backscattering occurs is identified as the Brillouin frequency $V_B$.

If performing distributed sensing method using spontaneous Brillouin backscattering to monitor temperature and strain of the structure 1, then when the temperature of the structure 1 changes, or when strain is applied to the structure 1, then the temperature or strain experienced by the optical fibre 5 will change. The change in the temperature or strain experienced by the optical fibre 5 will cause a shift in the Brillouin frequency. Thus by monitoring for shifts in the Brillouin frequency changes in the temperature and strain of the structure can be detected.

The spatial resolution of the temperature and strain measurement i.e. the accuracy within which the position at which the temperature and strain changes took place in the structure 1 is directly proportional to the duration of the pulse pump signal 7. However the spectral width of the generated stimulated Brillouin backscattering is inversely proportional to the duration of the pulse pump signal 7.

It should be noted that the resulting spectrum of Brillouin scattering in fibers is expressed by the convolution of the Brillouin pump spectrum and the intrinsic Brillouin scattering spectrum. The intrinsic Brillouin scattering means Brillouin scattering generated by two counter-propagating continuous pump and probe waves, showing typical spectral width of 30 MHz. Moreover, due to uncertainty relationship the spectral width of the pulsed pump spectrum is inversely proportional to the duration of the pulse, so that the temporal compression of pulse to achieve high spatial resolution manifests spectral broadening of Brillouin scattering.

Figure 4:
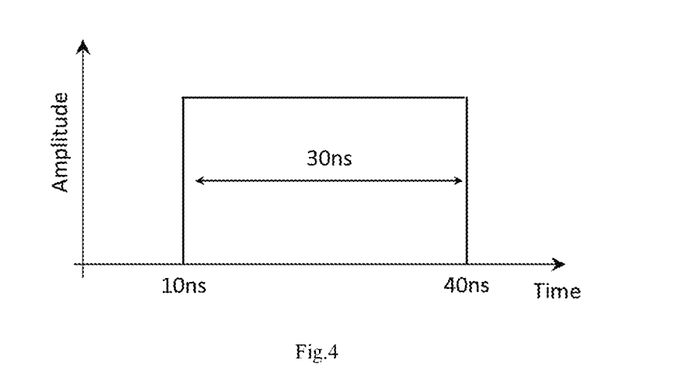
FIG. 4 shows a typical pulse pump signal used when performing a method as illustrated in FIG. 2a or 2b.
Figure 5:
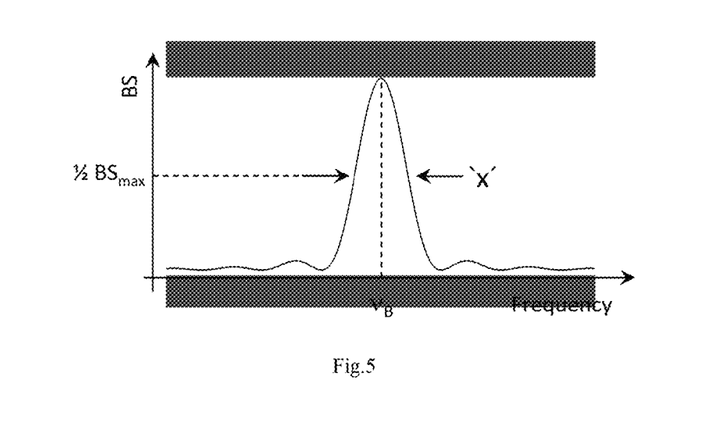
FIG. 5 is a Brillouin backscattering spectrum which is a graph of measured Brillouin backscattering (BS) versus frequency (freq), when the pulse signal of FIG. 4 is used to perform the method illustrated in FIG. 2a or 2b.
Figure 7:
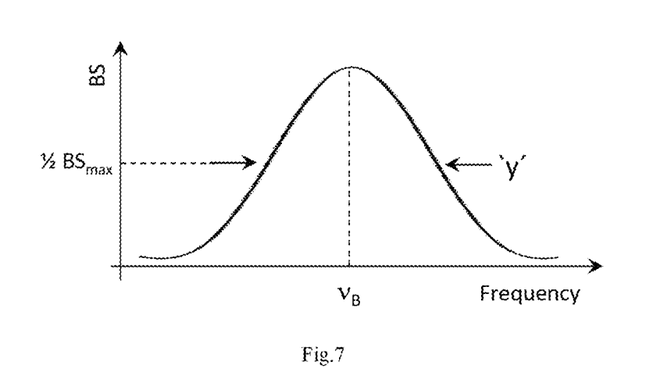
FIG. 7 is a Brillouin backscattering spectrum which is a graph of measured Brillouin backscattering (BS), when the pulse signal of FIG. 6 is used to perform the method illustrate in FIG. 2a or 2b.
Figure 12:
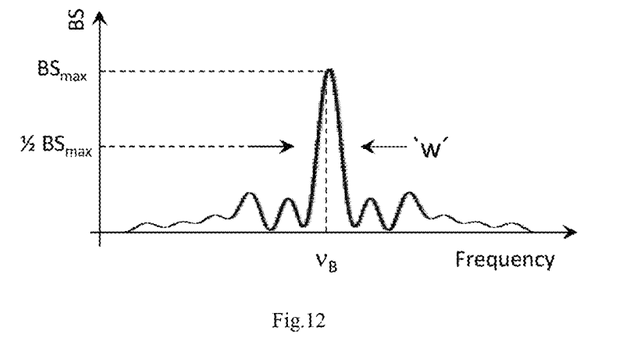
FIG. 12 shows Brillouin backscattering spectrum, which is a graph of measured stimulated or spontaneous Brillouin backscattering (BS) versus frequency (freq), which results when performing a method according to the present invention.

A typical pulse pump signal 7, which is used to carry out the distributed sensing method using stimulated Brillouin backscattering (FIG. 2a) or the distributed sensing method using spontaneous Brillouin backscattering (FIG. 2b), is illustrated in FIG. 4. This pulse pump signal has duration of 30 ns. FIG. 5 shows the Brillouin backscattering spectrum, which is a graph of measured Brillouin backscattering (BS) versus frequency (freq), which results when the pulse pump signal of FIG. 4 is used to perform either of the methods illustrated in FIG. 2a or 2b. The resulting spectral width 'x' of the generated stimulated or spontaneous Brillouin backscattering spectrum is quite narrow as can be seen from FIG. 5. Since the pulse pump signal 7 has a 30 ns duration it provides a spatial resolution of 3 m. It should be noted that the spectral width of a Brillouin spectrum is the full width of the Brillouin spectrum read at half the maximum intensity of the Brillouin spectrum (i.e. $\frac{1}{2}BS_{MAX}$) (i.e. read at half the maximum Brillouin scattering), as illustrated in FIGS. 5,7 and 12.

Figure 6:
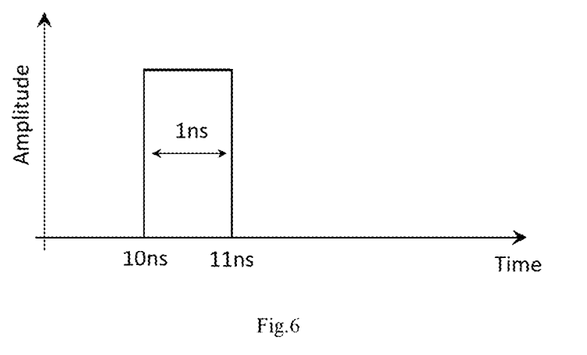
FIG. 6 shows a pulse signal which can provide improved sensing resolution when performing the methods illustrated in FIGS. 2a and 2b.

To improve the spatial resolution, the duration of the pulse pump signal can be decreased to 1 ns, for example, as is shown in FIG. 6. However as can be seen in FIG. 7 the spectral width 'y' of the resulting generated stimulated or spontaneous Brillouin backscattering spectrum is broadened with a broadening factor of 30 when compared to Brillouin scattering spectrum generated by 30 ns pulse. With such a broad spectral width it is difficult to unambiguously detect the peak of the generated stimulated or spontaneous Brillouin backscattering; accordingly it is difficult to detect a shift in the Brillouin frequency, and thus difficult to detect when changes in temperature or strain of the structure 1 have occurred. Moreover, the intensity of Brillouin backscattering is inversely proportional to the spectral width of the Brillouin backscattering spectrum, hence the signal to noise ratio (SNR) is degraded with 1 ns pulse pump signal, when compared to SNR with 30 ns pulse pump signal.

Thus, to increase the spatial resolution of the temperature and strain measurement the duration of pulse signal must be decreased. However, a decrease in the duration of the pump signal has the disadvantage that the spectral width of the generated stimulated or spontaneous Brillouin backscattering is broadened so that it becomes impossible, or at least difficult, to detect shifts in the Brillouin frequency.

Figure 8:
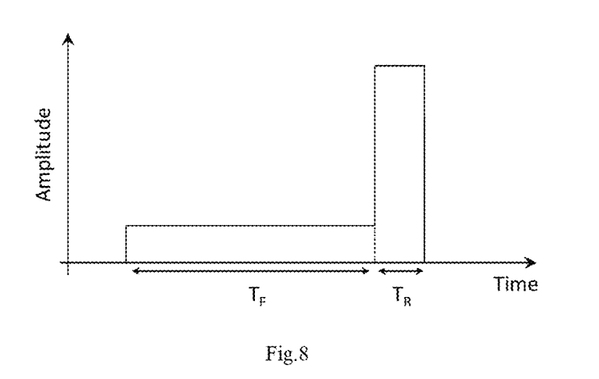
FIG. 8 is a graph illustrating the most-widely used double pulse configuration for a pump signal in the prior art.

In the prior art, several methods have been proposed to achieve a high resolution for Brillouin optical time-domain distributed sensing. Most techniques use a double pulse as a pump signal. FIG. 8 shows the most-widely used double pulse configuration for a pump signal in a distributed sensing system based on stimulated or spontaneous Brillouin scattering. The double pulse pump signal consists of a front pulse $T_F$ and a rear pulse $T_R$. The front pulse $T_F$ is the pulse which is passed into the sensing optical fibre first, and a rear pulse $T_R$ is passed into the sensing optical fibre after the front pulse $T_F$. As is clear from FIG. 8, there is a zero time delay between the front and rear pulses. The duration of the front pulse $T_F$ is in general much longer than the duration of the rear pulse $T_R$ while the intensity of the front pulse is weaker than that of the rear pulse.

Figure 9A:
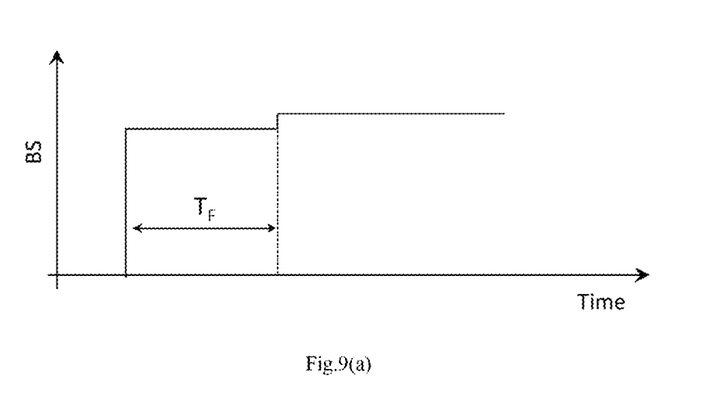
FIGS. 9a and 9b are graphs of measured stimulated Brillouin backscattering (BS) versus time, when the double pulse of FIG. 8 is used to perform the method illustrated in FIG. 2a or 2b.
Figure 9B:
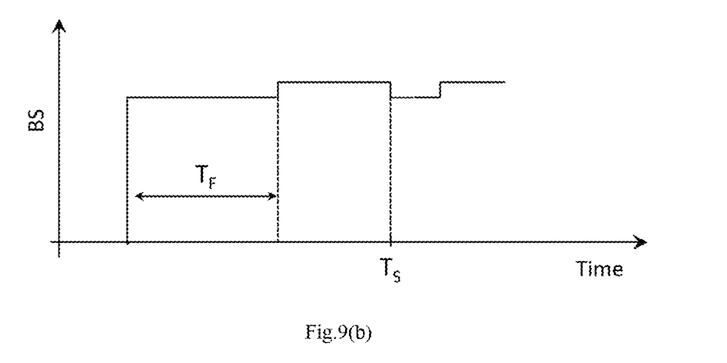

The roles of front pulse $T_F$ and a rear pulse $T_R$ are entirely different. The front pulse $T_F$ enters into a sensing fibre before the rear pulse $T_R$. In this condition, the stimulated Brillouin scattering (SBS) interaction between the front pulse $T_F$ and a counter-propagating probe signal pre-activates an acoustic wave at a position along the sensing fibre before the rear pulse $T_R$ arrives at that position. The strength of the pre-activated acoustic wave has dependence on the SBS interaction time. So, the front pulse width is preferably set to be as long as 30 ns, hence the generated acoustic wave is confined within a narrow spectrum. Due to the pre-activation of acoustic wave, the Brillouin back-scattering from the rear pulse $T_R$ can be enhanced, so that it makes it possible to achieve a high spatial resolution with improved measurement accuracy, when compared to the absence of the front pulse $T_F$. However, this system suffers from the poor contrast between Brillouin backscattering resulting from front pulse $T_F$ and Brillouin backscattering resulting from rear pulse $T_R$. Actually, strong Brillouin backscattering from the front pulse $T_F$ acts as a noise in the measurement of weak Brillouin scattering from the rear pulse $T_R$. This method therefore suffers from poor signal to noise ratio. FIGS. 9a&b illustrate the problem of poor signal to noise ratio.

FIG. 9a shows the intensity of the stimulated or spontaneous Brillouin backscattering in the time domain, along the length of the sensing fibre. Initially the spontaneous or stimulated Brillouin backscattering generated within the sensing fibre is due to the front pulse $T_F$; once the rear pulse $T_R$ is sent into the sensing fibre the spontaneous or stimulated Brillouin backscattering in the sensing fibre is due to both the front $T_F$ and rear pulse $T_R$. It is the rear pulse $T_R$ which is used to sense temperature or strain variations along the sensing fibre since rear pulse $T_R$ has the shortest duration and therefore provides the highest resolution. When there is a point along the sensing fibre which is subjected to a change in temperature or an change in strain (which, for example, is as a result of a change in the temperature or strain in the structure to which the sensing fibre is attached) this will be indicated in the Brillouin backscattering generated by the rear pulse $T_R$; an example of how the temperature change or strain change is illustrated in FIG. 9b. As can be seen in FIG. 9b, a temperature or strain variation experienced by the sensing fibre is indicated as a depression in the measured spontaneous or stimulated Brillouin backscattering, occurring at time Ts. Since the Brillouin backscattering generated by the rear signal $T_R$ is much smaller than the Brillouin backscattering generated by the front signal $T_F$ there is a poor signal to noise ratio i.e. it is difficult to identify the depression which occurs at Ts.

Thus, there is a need in the art to provide a method for a distributed sensing using stimulated or spontaneous Brillouin backscattering which provides a higher signal to noise ratio for high spatial resolution thus making it easier to detect the presence of a temperature change or strain change experienced by the sensing fibre and ultimately enabling improved detection of temperature and strain change in a structure with which the sensing fibre cooperates.

BRIEF SUMMARY OF THE INVENTION

According to the invention, a Brillouin optoelectronic measurement method comprising the steps of, providing a pump signal in a first end of an optical fiber to generate Brillouin backscattering, using the generated Brillouin backscattering to perform a measurement, characterised in that the pump signal comprises a front pulse and a rear pulse, wherein the front pulse is modulated.

The Brillouin optoelectronic measurement method may be a Brillouin optoelectronic measurement method which uses stimulated Brillouin scattering.

The Brillouin optoelectronic measurement method may be a Brillouin optoelectronic measurement method which uses spontaneous Brillouin scattering.

The measurement performed may be a measurement of temperature and/or strain within a structure. Due to the linear dependence of Brillouin frequency on temperature and strain, changes in temperature and strain of structure 1 which occur can be quantitatively determined based on the measured Brillouin frequency. Moreover, the absolute temperature and strain of the structure 1 can be also monitored using known correspondence between Brillouin frequency values and temperature and strain values for the monitored structure 1 (wherein the correspondence between Brillouin frequency values and temperature and strain values of the structure 1 are determined in a pre-calibration process, in which the Brillouin frequency is measured when the structure 1 is at known temperatures and strains). So, the measured Brillouin frequency is used to determine the absolute temperature and strain of the structure 1, and due to the linear relationship between Brillouin frequency and temperature and strain, is also used to measures changes in temperature and strain of the structure 1.

The step of using the generated Brillouin backscattering to perform a measurement may comprise using the generated Brillouin backscattering to determine temperature and strain changes in a structure with which the optical fibre cooperates.

The pump signal may generate spontaneous Brillouin scattering and the spontaneous Brillouin scattering is used to perform the measurement.

The method may further comprise the step of, providing a probe signal in a second end of said optical fiber which is opposite to the first end, so that both the pump and probe signals can counter propagate in the optical fiber and can interact in the optical fibre so that the generate Brillouin backscattering is stimulated Brillouin backscattering, and wherein the stimulated Brillouin scattering is used to perform the measurement.

The optical fibre is preferably a sensing fibre. A sensing fibre is an optical fibre which has been arranged to cooperate with a structure so that the properties of that structure can be monitored. The properties are preferably temperature and/or strain.

A front pulse is a pulse which is first passed into the optical fibre first when performing Brillouin optoelectronic measurement. A rear pulse is a pulse which is passed into the optical fibre after the front pulse has been passed into the optical fibre. It should be noted that there may be a zero time delay between the first pulse and rear pulse. The front pulse may be amplitude modulated. Amplitude modulated may include intensity modulated.

The front pulse may be amplitude modulated such that the front pulse defines at least two pulses. The two pulses may be referred to as the first and second pulse.

The front pulse may be amplitude modulated such that the front pulse defines as plurality of pulses greater than two pulses.

The front pulse may be amplitude modulated such that there is zero amplitude between the at least two pulses. The front pulse may be amplitude modulated such that there is zero amplitude between each of the plurality of pulses.

The amplitudes of the at least two pulses may be equal. The amplitudes of the plurality of pulses may be equal.

The amplitudes of the at least two pulses may be different. The amplitudes of at least some of the plurality of pulses may be different.

The amplitude of the pulse may be complex. If the amplitude of the pulse is complex, the real part of the amplitude will correspond to intensity of the pulse and the imaginary part of the amplitude will correspond to the phase of the pulse. The front pulse may be phase modulated.

The front pulse may be modulated so as to achieve an increase in signal to noise ratio.

The modulation of the front pulse may be optimized so as to achieve narrowing of the spectral width of a resulting Brillouin backscattering spectrum.

BRIEF DESCRIPTION OF THE DRAWINGS

FIGS. 1-9a&b, all illustrate aspects of the prior art.

FIG. 3a is a Brillouin backscattering spectrum which is a graph of the intensity of stimulated Brillouin backscattering (BS) measured versus frequency (freq), when performing the method illustrated in FIG. 2a;

The invention will be better understood with the aid of the description of an embodiment, which is given by way of example only, and illustrated by the figures, in which:

DETAILED DESCRIPTION OF POSSIBLE EMBODIMENTS OF THE INVENTION

The present invention relates to a method of distributed sensing; the method of distributed sensing may be one which uses stimulated Brillouin backscattering or which uses Spontaneous Brillouin Scattering.

In the present invention the method of distributed sensing (using stimulated or spontaneous Brillouin backscattering) is performed as known in the art (i.e. as described above with reference to FIGS. 2a and 2b), except in the present invention the pump signal used when to perform the method comprises a front pulse and a rear pulse, wherein the front pulse is modulated.

In summary, in the case of a method of distributed sensing which uses stimulated Brillouin backscattering, a sensing fibre (optical fibre) is arranged to cooperate with a structure the temperature of which, and strain within which, is to be monitored. A pump signal is provided in a first end of a sensing fibre, and a probe signal is provided in the opposite end of said sensing fibre, so that both the pump and probe signals can interact in the sensing fibre to generate stimulated Brillouin scattering. The stimulated Brillouin scattering is then measured and used to detect shifts in the Brillouin frequency. Detected shifts in the Brillouin frequency are used to determine changes in the temperature and strain in a structure in the manner well known in the art. However, in the present invention the pump signal used when performing the distributed sensing comprises a front pulse and a rear pulse, wherein the front pulse is modulated.

Figure 10:
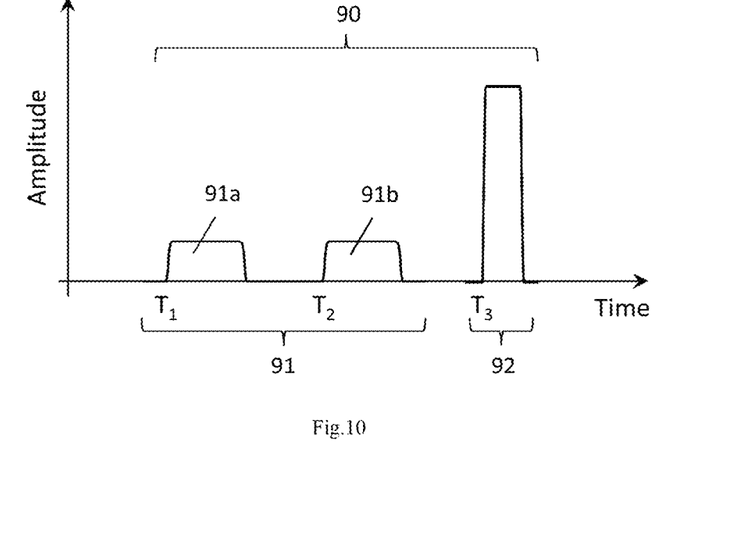
FIG. 10 shows one example of a pump signal which could be used when performing a method according to the present invention.

FIG. 10 shows one example of a pump signal 90 which could be used when performing a method according to the present invention. The pump signal 90 comprises a front pulse 91 and a rear pulse 92. The front pulse 91 is modulated; in this particular example the amplitude of the front pulse 91 is modulated. As shown in this example the front pulse 91 is amplitude modulated to define two pulses i.e. a first pulse 91a and a second pulse 91b; however it will be understood that the front pulse 91 could be modulated to have any number of pulses greater than two. The front pulse 91 is amplitude modulated such that there is zero amplitude between the first and second pulses 91a, 91b.

Figure 11A:
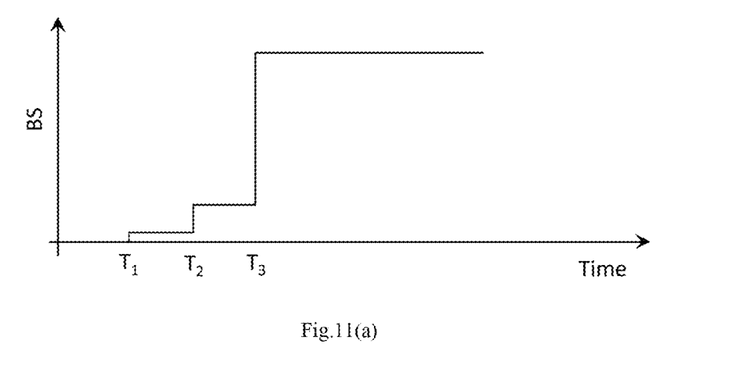
FIGS. 11a and 11b show an example of the measured stimulated Brillouin scattering (BS), in the time domain, which can be obtained when performing a method according to the present invention.
Figure 11B:
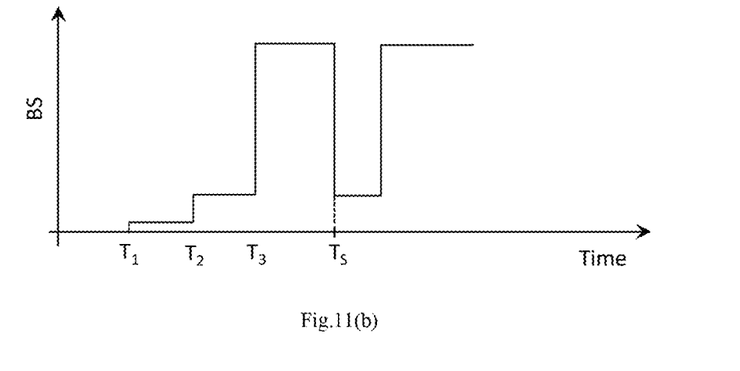

The resulting stimulated Brillouin scattering which occurs along the sensing fibre is illustrated in FIGS. 11a,b. FIGS. 11a,b illustrate the measured stimulated Brillouin scattering in the time domain. Unlike the stimulated Brillouin scattering which is generated by the front pulse in the prior art (as shown in FIGS. 8a&b) the stimulated Brillouin scattering generated by the front signal 91 is much less; this is due to the modulation of the front pulse 91, which prevents the acoustic wave from continuously growing in time. In particular the modulation of the front pulse 91 which provides a zero amplitude in the interval between the first and second pulses 91a,91b results in a decrease of the amount of stimulated Brillouin scattering generated by the front pulse 91. It will be understood that the front pulse 91 does not necessarily need to have a zero amplitude in the interval between the first and second pulses 91a,91b, rather any reduction in the amplitude between the first and second pulses 91a,91b will result in a decrease in the amount of stimulated Brillouin scattering generated by the front signal 91.

Accordingly, compared to the prior art, the stimulated Brillouin scattering which results from the rear pulse 92 becomes more prominent due to the reduction in the stimulated Brillouin scattering generated by the front pulse 91. FIG. 11a illustrates the stimulated Brillouin scattering in the sensing fibre; at time T1 the stimulated Brillouin scattering in the sensing fibre is that which results from the pulse 91a; at time T2 the stimulated Brillouin scattering in the sensing fibre is that which results from both the first and second pulse 91a,91b of the front pulse 91. Since the amplitude of the front signal 91 goes to zero between the first and second pulses 91a,91b the resulting stimulated Brillouin scattering generated in the sensing fibre by the front signal 91 is reduced. At T3 the rear signal 92 is passed into the sensing fibre and the stimulated Brillouin scattering in the sensing fibre is that which results from the first and second pulses 91a,91b of front pulse 91 and the rear signal 92. Since the resulting stimulated Brillouin scattering generated in the sensing fibre by the front signal 91 is reduced, the stimulated Brillouin scattering generated in the sensing fibre by the rear signal 92 is more prominent therefore resulting in a higher signal to noise ratio as shown in FIG. 11b.

The higher signal to noise ratio can be best seen in FIG. 11b. Since the stimulated Brillouin scattering generated in the sensing fibre by the front signal 91 is reduced, the amount of noise is reduced, thus resulting in a higher signal to noise ratio. FIG. 11b shows the stimulated Brillouin scattering along the length of the sensing fibre. A temperature or strain change has been experienced by the sensing fibre at some point along its length. The temperature or strain change which is experienced by the sensing fibre will be due to a temperature or strain change which has occurred in the structure with which the sensing fibre cooperates with i.e. the structure being monitored. The change in temperature or strain experienced by the sensing fibre appears as a depression occurring at time Ts in the measured stimulated Brillouin backscattering. Comparing FIG. 11b with FIG. 9b it is clear that since the stimulated Brillouin scattering generated in the sensing fibre by the front signal 91 is reduced the Brillouin scattering generated in the sensing fibre by the rear signal 92 is more prominent and thus the depression in the measured stimulated Brillouin backscattering, which indicates the temperature or strain change, can be more easily identified.

FIG. 10 illustrates a pump signal 90 which could be used to when performing a method of distributed sensing technique using Stimulated Brillouin Scattering (as previously described); it will be noted that the pump signal 90 illustrated in FIG. 10 could also be used when performing a method of distributed sensing technique using Spontaneous Brillouin Scattering (SPBS). In the present invention the method of distributed sensing technique using Spontaneous Brillouin Scattering (SPBS) is carried out in the same manner as in the prior art, except the pump signal used is modulated as is shown in FIG. 10. The pump signal 90 used when performing the method of distributed sensing technique using Spontaneous Brillouin Scattering (SPBS), may have some or all of the features of the pump signal 90 which was described above with references to FIG. 10. The resulting Spontaneous Brillouin Scattering will take a form similar to that shown in FIGS. 11a and 11b. Using the modulated pump signal 90 provides the same advantages as those described earlier in relation to the distributed sensing technique using Stimulated Brillouin Scattering; namely using the modulated pump signal 90 to perform a method of distributed sensing technique using Spontaneous Brillouin Scattering (SPBS), provides for a higher signal to noise ratio.

In Spontaneous Brillouin Scattering (SPBS) sensing technique no probe signal is used; only acoustic waves which are generated by the pump signal in the optical fiber, are used to generate the Brillouin backscattering. The acoustic waves generated in the fiber will backscatter parts of the pump signal thereby generating Brillouin backscattering known as Spontaneous Brillouin backscattering. Since no probe signal is used in Spontaneous Brillouin Scattering (SPBS) sensing technique, the intensity of the Brillouin backscattering is lower, however the principles of both the Spontaneous Brillouin Scattering (SPBS) sensing technique and Stimulated Brillouin Scattering (SPBS) sensing techniques are similar in that both techniques use shifts in the Brillouin frequency for measurement of changes in the temperature and strain of a structure, and both techniques use Brillouin frequency to measure absolute strain and temperature of a structure.

In Spontaneous Brillouin Scattering (SPBS) sensing technique a sensing fibre (optical fibre) is arranged to cooperate with a structure the temperature of which, and strain within which, is to be monitored. A pump signal only is provided in a first end of a sensing fibre; as the pump signal propagates along the optical fiber, acoustic waves will be generated within optical fiber; these acoustic waves will backscatter parts of the pulse signal to generate spontaneous Brillouin backscattering. The spontaneous Brillouin backscattering is then measured and used to detect shifts in the Brillouin frequency (using know techniques). Detected shifts in the Brillouin frequency are used to determine changes in the temperature and strain in a structure in the manner well known in the art. However, in the present invention the pump signal used when performing the distributed sensing comprises a front pulse and a rear pulse, wherein the front pulse is modulated.

FIG. 12 is a Brillouin backscattering spectrum, which is obtained when a pump signal 90 as shown in FIG. 10 is used to perform a method of distributed sensing using stimulated Brillouin backscattering or Spontaneous Brillouin Scattering. The Brillouin backscattering spectrum will be a stimulated Brillouin backscattering spectrum or a spontaneous Brillouin backscattering spectrum, depending on whether the method as illustrated in FIG. 2a or FIG. 2b is carried out. The Brillouin backscattering spectrum is a graph of measured Brillouin backscattering (BS) versus frequency (freq).

FIG. 12 illustrates a further advantage which is associated with the use of a pump signal 90 which has a front pulse 91 which is modulated. As a result of the modulated front pulse 91 of the pump signal 90, the spectral width 'w' of the resulting Brillouin backscattering spectrum is narrower, compared to the spectral width of a Brillouin backscattering spectrum which results from a pump signal which does not have modulated front pulse. For example, the spectral width 'w' of the Brillouin backscattering spectrum shown in FIG. 12 is much narrower than the spectral width 'y' of the Brillouin backscattering spectrum shown in FIG. 7 which results from the single pulse pump signal shown in FIG. 6, which does not comprise a modulate front pulse. Even though the duration of the pulse in FIG. 6 is identical to that of the rear pulse 92 in FIG. 10, so that the spatial resolution is same.

It should be noted that the spectral width of a Brillouin spectrum is the full width of the Brillouin spectrum read at half the maximum intensity of the Brillouin spectrum (i.e. read at half the maximum Brillouin scattering).

Advantageously, the narrowing of the Brillouin spectrum allows for improved measurement accuracy and/or measurement resolution, i.e. the accuracy of the temperature and strain measurement while preserving the spatial resolution, i.e. the accuracy with which the position at which the temperature and strain change took place, since a small amount of shift in Brillouin frequency can be accurately determined due to the narrow feature of Brillouin scattering spectrum. Consequently, distributed sensing with enhanced spatial resolution can be achieved and a reduction in degradation of the measurement accuracy can also be achieved.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A Brillouin optoelectronic measurement method comprising the steps of:
   providing a pump signal in a first end of an optical fiber to generate Brillouin backscattering; and
   using the generated Brillouin backscattering to perform a measurement,
   wherein the Brillouin backscattering generated is associated with a portion of an incident power of the pump signal that is propagated back to the first end of the optical fiber,
   wherein the pump signal comprises a front pulse and a rear pulse, wherein the front pulse is amplitude modulated such that the front pulse defines at least two pulses and there is zero amplitude in the interval between said at least two pulses, and wherein the rear pulse is non-modulated,
   wherein the front pulse is provided into the optical fiber before the rear pulse.

2. The Brillouin optoelectronic measurement method according to claim 1 wherein the step of using the generated Brillouin backscattering to perform a measurement comprises using the generated Brillouin backscattering to determine temperature and strain changes in a structure with which the optical fibre cooperates.

3. The Brillouin optoelectronic measurement method according to claim 1 wherein the pump signal generates spontaneous Brillouin scattering and the spontaneous Brillouin scattering is used to perform the measurement.

4. The Brillouin optoelectronic measurement method according to claim 1 further comprising a step of providing a probe signal in a second end of said optical fiber which is opposite to the first end, so that both the pump and probe signals can counter propagate in the optical fiber and can interact in the optical fibre so that the generated Brillouin backscattering is stimulated Brillouin backscattering, and wherein the stimulated Brillouin scattering is used to perform the measurement.

5. The Brillouin optoelectronic measurement method according to claim 1 wherein the amplitudes of the at least two pulses are equal.

6. The Brillouin optoelectronic measurement method according to claim 1 wherein the front pulse is phase modulated.

7. The Brillouin optoelectronic measurement method according to claim 1 wherein there is a zero time delay between the front pulse and the rear pulse.

8. The Brillouin optoelectronic measurement method according to claim 1 wherein the front pulse is provided into the optical fibre before the rear pulse.

* * * * *

UNITED STATES PATENT AND TRADEMARK OFFICE
CERTIFICATE OF CORRECTION

PATENT NO. : 9,500,560 B2
APPLICATION NO. : 14/441893
DATED : November 22, 2016
INVENTOR(S) : Chin It is certified that error appears in the above-identified patent and that said Letters Patent is hereby corrected as shown below:

In the Specification

Column 1, Line 62: please delete the symbol "$\gamma_0$" and replace it with -- $\lambda_0$ --

Column 1, Line 63: please delete the symbol "$v_0=c/\gamma_0$," and replace it with -- $v_0=c/\lambda_0$, --

Column 2, Line 47: please delete the symbol "$\gamma_0$." and replace it with -- $\lambda_0$. --

Signed and Sealed this
Fourteenth Day of February, 2017

Michelle K. Lee
*Director of the United States Patent and Trademark Office*